United States Patent [19]

Toyoda et al.

[11] 4,453,064
[45] Jun. 5, 1984

[54] ENAMELED METAL TURNTABLE IN A COMBINATION MICROWAVE AND ELECTRIC OVEN

[75] Inventors: Munemitsu Toyoda, Osaka; Koichiro Adachi, Kitakatsuragi, both of Japan

[73] Assignee: Sharp Kabushiki Kaisha, Osaka, Japan

[21] Appl. No.: 64,588

[22] Filed: Aug. 7, 1979

Related U.S. Application Data

[63] Continuation of Ser. No. 832,960, Sep. 13, 1977, abandoned.

[30] Foreign Application Priority Data

Sep. 13, 1976 [JP] Japan ............................ 51-124043

[51] Int. Cl.³ .............................................. H05B 6/74
[52] U.S. Cl. ...................... 219/10.55 F; 219/10.55 E; 108/20

[58] Field of Search ................. 219/10.55 B, 10.55 F, 219/10.55 R, 10.55 E; 108/20, 139, 103; 248/349; 274/1 C, 39 R, 39 A; 126/41 A, 182; 198/803; 211/78, 77, 95

[56] References Cited

U.S. PATENT DOCUMENTS 2,480,045  8/1949  Reeves ................................ 126/41
3,377,562  4/1968  Staats ....................... 219/10.55 F X

*Primary Examiner*—B. A. Reynolds
*Attorney, Agent, or Firm*—Birch, Stewart, Kolasch & Birch

[57] ABSTRACT

The present invention is directed to a turntable in a combination microwave and electric oven wherein a sheath heater is disposed between the turntable and a bottom wall of the oven cavity. The turntable is made of an enameled metal plate to ensure stable, or, uniform cooking in both of the microwave cooking mode and electric cooking mode. In a preferred form, openings are formed in the enameled metal turntable to stir the microwave energy during the microwave cooking mode.

7 Claims, 6 Drawing Figures

ENAMELED METAL TURNTABLE IN A COMBINATION MICROWAVE AND ELECTRIC OVEN

This application is a continuation of copending application Ser. No. 832,960, filed on Sept. 13, 1977 abandoned.

BACKGROUND OF THE INVENTION

The present invention relates to a combination microwave and electric oven and, more particularly, to a turntable employed within the combination microwave and electric oven.

A combination microwave and electric oven has been developed as disclosed in U.S. Pat. No. 3,172,987 entitled "COMBINATION ELECTRIC AND ELECTRONIC OVENS" issued on Mar. 9, 1965. A turntable is effective to perform a uniform microwave cooking, and a heater means is disposed below the turntable to maintain the oven temperature at a predetermined value in the electric heating mode.

In the conventional combination microwave and electric oven, a heater means is disposed between a stainless steel turntable and a bottom wall of an oven cavity. The conventional combination microwave and electric oven such as disclosed in the above-mentioned U.S. Pat. No. 3,172,987 is very large and, therefore, a sufficient space is provided between the stainless steel turntable and the heater means.

However, when a compact size combination microwave and electric oven is desired to be fabricated, the distance between the turntable and the heater means is unavoidably reduced. When the turntable is made of stainless steel, a uniform cooking can not be performed in the electric cooking, since the stainless steel turntable does not have a uniform surface temperature when the heater means is close to the stainless steel turntable.

Moreover, there is a possibility that sparks are generated by stainless steel turntable when a microwave of a high frequency, for example, $2450 MH_z$, is introduced into the oven cavity.

OBJECTS AND SUMMARY OF THE INVENTION

Accordingly, an object of the present invention is to provide a combination microwave and electric oven including a turntable wherein a heater is disposed below the turntable.

Another object of the present invention is to provide a compact size combination microwave and electric oven including a turntable wherein a heater is disposed below a turntable.

Still another object of the present invention is to stabilize microwave cooking and electric cooking in a combination microwave and electric oven including a turntable wherein a heater is disposed below a turntable.

Yet another object of the present invention is to provide a combination microwave and electric oven which can perform uniform cooking in both the microwave cooking mode and electric cooking mode.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a sheath heater is disposed between a turntable and a bottom wall of an oven cavity in a combination microwave and electric oven. The turntable is made of an enameled metal plate to ensure stable, or, uniform cooking in both of the microwave cooking mode and electric cooking mode.

The enamel coating on the metal turntable functions to provide a uniform surface temperature of the metal turntable in the electric cooking mode, and to prevent the occurrence of sparks in the microwave cooking mode. In a preferred form, openings are formed in the enameled metal turntable to stir the microwave energy in the microwave cooking mode during the rotation of the turntable.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
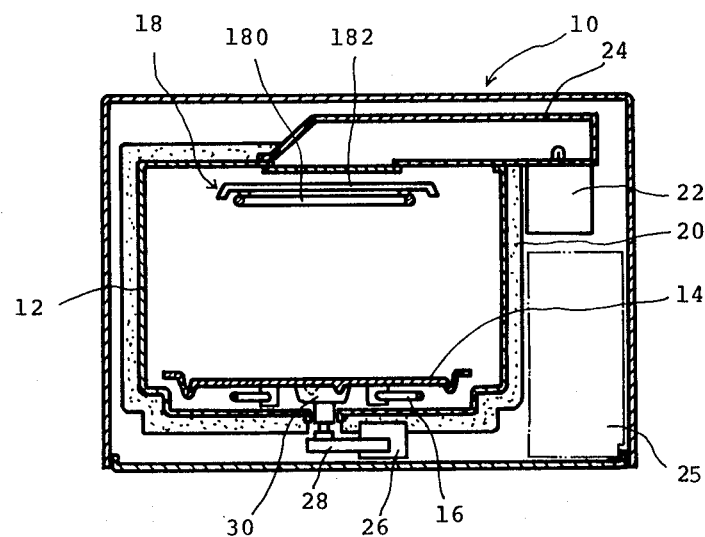
FIG. 1 is a sectional view of a combination microwave and electric oven including an embodiment of an enameled metal turntable of the present invention.

FIG. 1 shows a combination microwave and electric oven including an embodiment of an enameled metal turntable of the present invention.

A combination microwave and electric oven 10 mainly comprises an oven wall 12 defining an oven cavity, an enameled metal turntable 14 for supporting a foodstuff mounted thereon, and a sheath heater 16 between the turntable 14 and the bottom wall of the oven cavity.

An upper heater unit 18 comprises a sheath heater 180 and a reflection plate 182. The upper heater unit 18 and the sheath heater 16 function, in combination, to heat up the oven temperature in the electric heating, cooking mode. A heat insulating wall or an athermanous wall 20 made of, for example, glass wool, asbestos or calcium silicate is provided in such a manner as to surround the oven wall 12, whereby the oven cavity is maintained at a high temperature when the electric heating, cooking mode is performed.

Microwave energy generated from a magnetron 22 is introduced into the oven cavity through a waveguide 24 for performing the microwave cooking. A power supply unit 25 is disposed outside the oven cavity.

The enameled metal turntable 14 is driven to rotate in both the microwave cooking mode and the electric heating cooking mode through the use of turntable motor 26, a drive mechanism 28, and a coupler 30.

Figure 2:
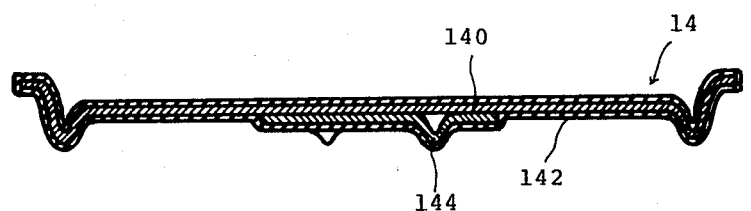
FIG. 2 is a sectional view of an embodiment of the enameled metal turntable employed within the combination microwave and electric oven of FIG. 1.

FIG. 2 shows a cross-section view of the enameled metal turntable 14.

The enameled metal turntable 14 mainly comprises a steel plate 140 coated with enamel 142. Coupling projections 144 are formed on the rear surface of the enameled metal turntable 14. The enameled metal turntable 14 is removably engaged with the coupler 30 through the use of the coupling projections 144. The thickness of the enamel 142 is preferably 0.1 through 0.5 mm.

Figure 3:
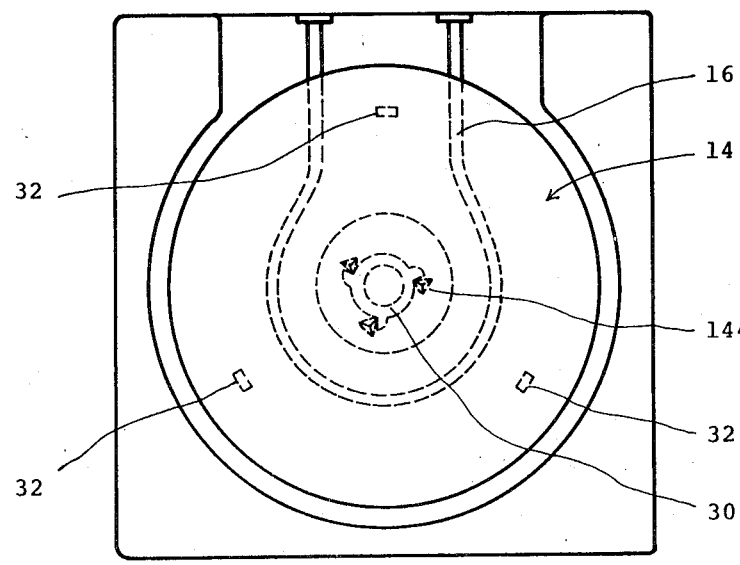
FIG. 3 is a plan view showing the enameled metal turntable of FIG. 2 and showing in dotted lines a coupler for driving the enameled metal turntable.

FIG. 3 shows the enameled metal turntable 14 engaged with the coupler 30. Like elements corresponding to those of FIGS. 1 and 2 are indicated by like numerals.

The enameled metal turntable 14 is driven to rotate at the center thereof, and supporting rollers 32 are rotatably fixed to the bottom wall of the oven cavity at desired positions to ensure stable rotation of the enameled metal turntable 14.

Figure 4:
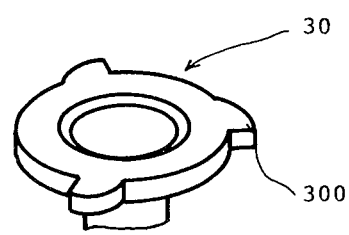
FIG. 4 is a perspective view of the coupler shown in FIG. 3.

FIG. 4 shows the coupler 30. The coupler 30 is made of heat-resisting plastics, and has projections 300 which are engaged with the coupling projections 144 for rotating the enameled metal turntable 14.

Figure 5:
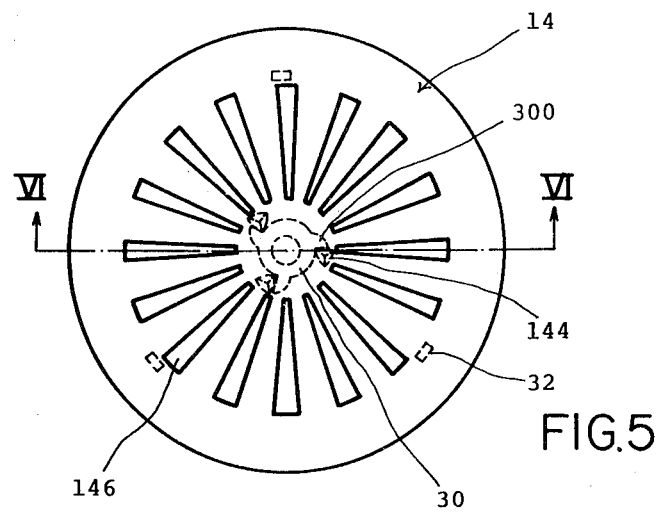
FIG. 5 is a plan view of another embodiment of the enameled metal turntable of the present invention.
Figure 6:
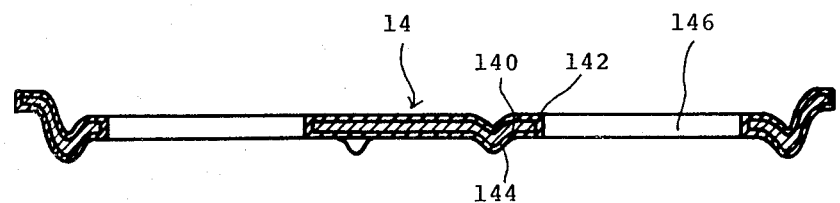
FIG. 6 is a sectional view of the enameled meatl turntable as seen along line VI-VI of FIG. 5.

FIGS. 5 and 6 show another embodiment of the enameled metal turntable of the present invention. Like elements corresponding to those of FIGS. 2 through 4 are indicated by like numerals.

Openings 146 are formed in the enameled metal turntable 14 for stirring the microwave energy introduced into the oven cavity during the microwave cooking mode as the enameled metal turntable 14 rotates.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A combination microwave and electric oven comprising:
    an oven cavity including a bottom wall;
    a microwave generation means for microwave cooking purposes;
    a turntable disposed in a lower section of said oven cavity and being positioned closely adjacent to said bottom wall;
    heater means disposed between said turntable and the bottom wall of said oven cavity for electric cooking purposes;
    said turntable comprises a metal turntable of a high thermal conductivity for reflecting microwaves and transmitting heat energy and being coated with a non-metallic enamel material having a thickness of 0.1 through 0.5 mm for preventing an occurrence of sparks while said turntable is driven to rotate during microwave cooking, and for uniformly distributing heat energy when the heater means is energized;
    said oven cavity being insulated on at least a portion of an outer surface thereof to maintain said oven cavity at an elevated temperature during electric cooking; and
    supporting rollers operatively disposed adjacent said bottom wall of said oven cavity to ensure stable rotation of the enameled metal turntable.

2. The combination microwave and electric oven of claim 1, wherein openings are formed in the metal turntable body and the enamel layer.

3. A combination microwave and electric oven comprising:
    an oven cavity including a bottom wall;
    a microwave generation means for microwave cooking purposes;
    a coupler projected upwardly from a bottom wall of said oven cavity;
    a metal turntable disposed at the lower section of said oven cavity and being positioned closely adjacent to said bottom wall and including a plurality of coupling projections extending downwardly therefrom to mate with said coupler, an enamel material having a thickness of 0.1 through 0.5 mm formed on said turntable and said coupling projections for preventing an occurrence of sparks while said turntable is driven to rotate during microwave cooking, and for ensuring uniform heating during electric cooking;
    a heater means disposed between said turntable and the bottom wall of said oven cavity for electric cooking purpose; and
    supporting rollers operatively disposed adjacent said bottom wall of said oven cavity to ensure stable rotation of the enameled metal turntable;
    wherein said heater means is close to the rear surface of said enameled metal turntable and is disposed in a fashion to surround said coupler.

4. The combination microwave and electric oven of claim 3, wherein said coupler is made of heat-resisting plastics.

5. A combination microwave and electric oven according to claim 3, wherein openings are formed in the metal turntable and the non-metallic material.

6. A turntable for use in a combination microwave and electric oven and adapted to be removed therefrom including a microwave generation means and a heater means, said turntable comprising:
    a metal body of a high thermal conductivity for reflecting microwaves and transmitting heat energy, said metal body including a plurality of coupling projections disposed on a bottom surface and extending downwardly therefrom;
    said metal body including an indented surrounding edge which protects downwardly from said bottom surface for supporting said turntable on a surface when said turntable is removed from the combination microwave and electric oven; and
    an enamel material layer having a thickness of 0.1 through 0.5 mm formed on said metal body, said coupling projections and said indented surrounding edge for preventing an occurrence of sparks during microwave cooking and for uniformly distributing the heat energy when the heater means is energized.

7. A turntable according to claim 6, wherein openings are formed in the turntable metal body and the non-metallic layer.

* * * * *